United States Patent
Matta et al.

(10) Patent No.: US 11,796,336 B2
(45) Date of Patent: Oct. 24, 2023

(54) SYSTEMS, METHODS AND COMPUTER PROGRAM PRODUCTS FOR DETERMINING ROUTES FOR TEST DRIVES OF AUTONOMOUS AND/OR PARTIALLY AUTONOMOUS VEHICLES

(71) Applicant: FEV Group GmbH, Aachen (DE)

(72) Inventors: Sherif Matta, Rochester Hills, MI (US); Josh Martens, Royal Oak, MI (US)

(73) Assignee: FEV Group GmbH, Aachen (DE)

( * ) Notice: Subject to any disclaimer, the term of this patent is extended or adjusted under 35 U.S.C. 154(b) by 190 days.

(21) Appl. No.: 17/117,528

(22) Filed: Dec. 10, 2020

(65) Prior Publication Data

US 2022/0187082 A1    Jun. 16, 2022

(51) Int. Cl.
*G01C 21/36* (2006.01)

(52) U.S. Cl.
CPC ..... *G01C 21/3667* (2013.01); *G01C 21/3664* (2013.01)

(58) Field of Classification Search
CPC .................................................. G01C 21/3644
See application file for complete search history.

(56) References Cited

U.S. PATENT DOCUMENTS

| | | | | |
|---|---|---|---|---|
| 6,728,635 | B2* | 4/2004 | Hamada | G01C 21/32 701/438 |
| 2011/0238457 | A1* | 9/2011 | Mason | G06Q 10/063112 705/7.14 |
| 2018/0259356 | A1* | 9/2018 | Rolf | G01C 21/3682 |
| 2019/0390963 | A1* | 12/2019 | Kumar | G01C 21/3667 |
| 2020/0189608 | A1* | 6/2020 | Braley | G01C 21/3407 |

* cited by examiner

*Primary Examiner* — Rami Khatib
*Assistant Examiner* — Shahira Baajour
(74) *Attorney, Agent, or Firm* — Dinsmore & Shohl LLP

(57) ABSTRACT

A method for determining routes for test drives of autonomous vehicles, wherein a plurality of test features are to be encountered or avoided on the routes. The method includes determining a geographical area in which a test drive is to take place, determining a starting point, determining a destination point, determining the plurality of test features, which are relevant for the test drive, creating a logical expression which places the plurality of test features in a logical relationship to one another, determining, at least one route which are located within the geographical area, which have the starting point and the destination point and which satisfy the logical expression, using a map material for the area and positions or areas where the plurality of test features are located, and displaying a representation of the determined routes for a user for the purpose of selecting a selected route.

8 Claims, 3 Drawing Sheets

SYSTEMS, METHODS AND COMPUTER PROGRAM PRODUCTS FOR DETERMINING ROUTES FOR TEST DRIVES OF AUTONOMOUS AND/OR PARTIALLY AUTONOMOUS VEHICLES

TECHNICAL FIELD

The present disclosure generally relates to determining routes for test drives, and, more specifically, to systems, methods, and computer program products for determining routes for test drives of autonomous and/or partially autonomous vehicles.

BACKGROUND

It is known to generate routes for an autonomous vehicle. However, these known methods for generating the routes do not include any features which are unsafe for autonomous driving of the autonomous vehicle.

SUMMARY

A method according to the invention for determining routes for test drives of autonomous and/or partially autonomous vehicles, whereby test features are to be encountered and/or avoided on the routes, includes the steps of determine a geographical area B in which a test drive is to take place, determine a starting point S from which the test drive should start, determine a target point Z at which the test drive should end, determine test features T1, . . . , Tn, which are relevant for the test drive, create a logical expression which places the test features T1, . . . , Tn in a logical relationship to one another, determine routes which are located within the geographical area B, which have the starting point S and the destination point Z, and which satisfy the logical expression, by means of a database which includes map material for the area B and positions and/or areas where and/or in which the test features T1, . . . , Tn are located, by a computational device, and display a representation of the determined routes for a user for the purpose of selecting a selected route.

When selecting routes for test drives for autonomous and/or partially autonomous vehicles, it is crucial that test features are encountered during the test drive, for example to enable validation of driver assistance systems.

By determining a logical expression, which sets the test features in a logical relation to each other, it is possible to make the routes satisfy the logical expression.

Test features include a plurality of traffic lights, road signs and/or speed limits. This enables the validation of driver assistance systems with respect to these test features.

A computational device in accordance with the embodiments described herein is for determining routes for test drives of autonomous and/or partially autonomous vehicles, whereby test features are to be encountered and/or avoided on the routes, is designed and set up to carry out a method in accordance with the invention. The computing device includes an input device for determining a geographical area B, in which a test drive is to take place, and/or for determining a starting point S, from which the test drives are to start, and/or for determining a destination point Z, at which the test drive is to end, and/or for determining test features T1, . . . , Tn, which are relevant for the test drive, and/or for generating a logical expression which sets the test features T1, . . . , Tn into a logical relationship to one another. Furthermore, the computing device includes a database device for accessing a database including map material for area B and positions and/or areas where and/or in which the test features T1, . . . , Tn are located. The computing device further includes a display device for displaying determined routes for a user to select a selected route.

A database in accordance with the embodiments described herein includes map material for a geographical area B in which a test drive is to take place. Furthermore, the database includes positions and/or areas where and/or in which test features T1, . . . , Tn are located.

A computer program product in accordance with the embodiments described herein includes a program which, when executed by a computer, causes the computer to perform a procedure according to the embodiments described herein for determining routes for test drives of autonomous and/or partially autonomous vehicles. The computer includes a processing device, and a non-transitory, processor-readable storage medium in communication with the processing device, wherein the non-transitory, processor-readable storage medium includes one or more programming instructions that when executed by the computer program product, causes the processing device to perform a procedure according to the embodiments described herein for determining routes for test drives of autonomous and/or partially autonomous vehicles.

The advantages of the procedure according to the embodiments described herein arise in the same way for the computational device according to the embodiments described herein, the database according to the embodiments described herein and the computer program product according to the embodiments described herein.

The dependent claims describe advantageous embodiments of the present disclosure.

Preferred embodiments are explained in more detail by means of the following figures.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
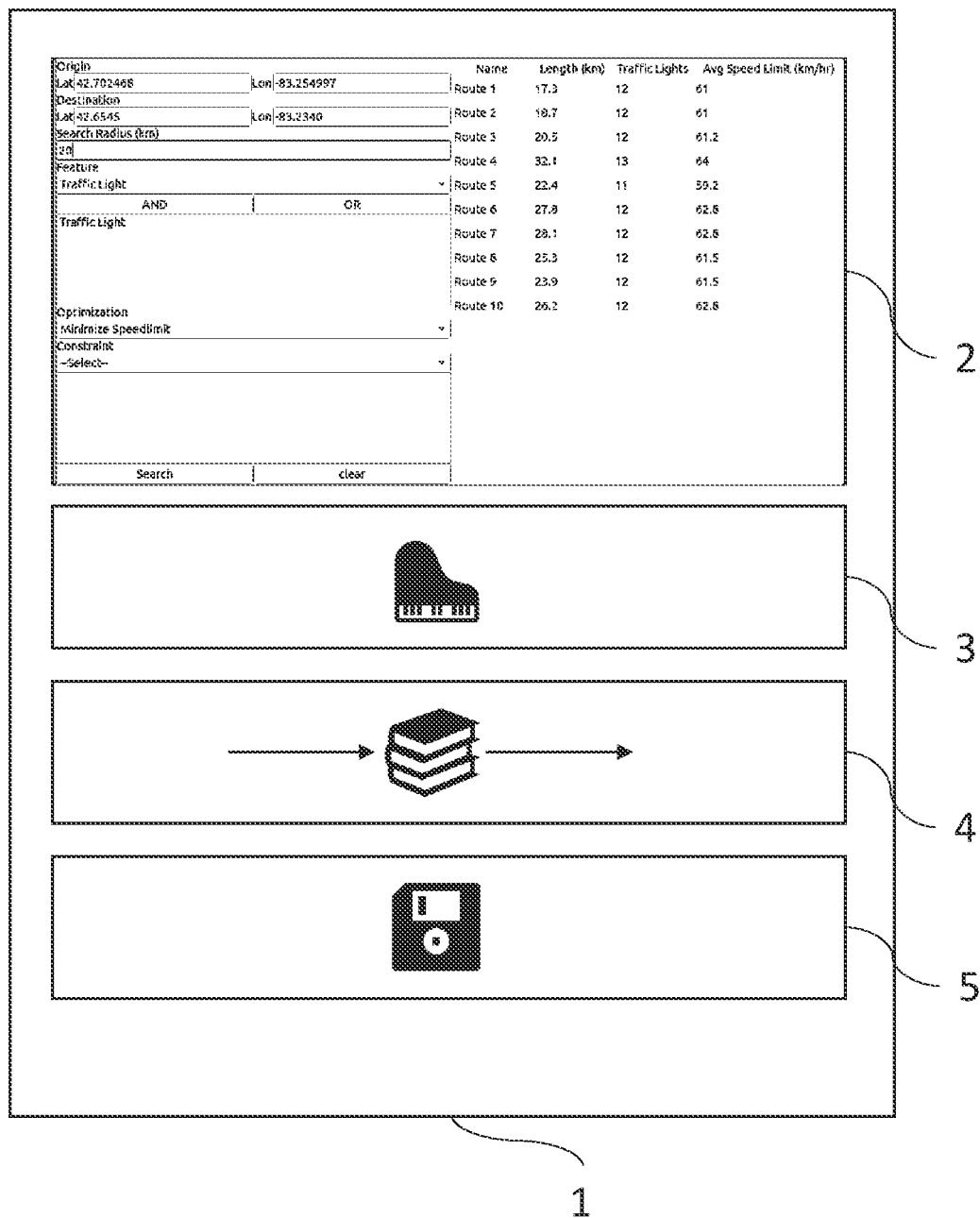
FIG. 2 schematically depicts an embodiment of a computing device according to one or more embodiments shown and described herein.

FIG. 2 shows an embodiment of a computational device 1 for determining routes 10 for test drives of autonomous and/or partially autonomous vehicles, where on the routes 10 test features 14 are to be encountered and/or avoided. The computational device 1 includes an input device 3, a database device 4, a display device 1 and an execution example of a computer program product 5.

In this embodiment, the database device 4 includes an embodiment of a database 17 according to the embodiments described herein. The database 17 includes map material for a geographical area B 11 in which a test drive is to take place as well as positions and/or areas where and/or in which test features T1, . . . , Tn 14 are located.

Using input device 3, a geographical area B 11 is first determined in which a test drive is to take place. For this purpose, the computational device 1 is provided with an input mask and a keyboard. A user of the computational device 1 enters a geographical point with the keyboard, where a first test drive is to start.

The input device 3 determines a starting point S 12 from which the test drive is to start.

In this embodiment the starting point is specified by means of geographical coordinates. These are Lat: 42.702468 and Lon: −83.254997.

The input device 3 determines a target point Z 13 at which the test drive is to end. The user of calculation device 1 enters the target point at Lat: 42.6545 and Lon: −83.2340.

The geographical area B 11 is determined by means of the starting point S 12 and a longitude of a radius around the starting point S 12.

The user of computational device 1 enters the radius of 20 km.

Now the plurality of test features T1, . . . , Tn, 14, which are relevant for the test drive, are determined.

The user of c computational device 1 enters the test characteristics in table form in the input mask.

The T1, . . . , Tn, 14 include a plurality of traffic lights, road signs and speed limits.

The user now selects traffic lights as the first test feature T1. As the second test feature T2, the user specifies an average minimum speed limit of 50 km/h, which should be present on the routes.

Now the frequencies H1, . . . , Hn 15 of the test features T1, . . . , Tn, 14 are determined, with which the test features T1, . . . , Tn, 14 should be encountered and/or avoided during the test drive.

The user of the computational device 1 specifies that test feature T1 should be encountered at least 5 times on the routes. Accordingly, H1 is determined to 5.

The user of computational device 1 does not specify any further relevant test features.

Now a logical expression 16 is created, which sets the test features T1, . . . , Tn 14 into a logical relation.

The frequencies H1, . . . , Hn 15 are considered for the creation of the logical expression 16.

In this embodiment, the expression 16 is determined by the arithmetic unit 1. Thus, the expression results to:

$$((T_1 \times H_1) \text{ and } T_2)$$

Now a determination of routes 10, which are located within the geographical area B 10, which have the starting point S 11 and the destination point Z 12, and which fulfill the logical expression 16, takes place by using a database 17, which includes map material for the area B 11 and positions and/or areas, at which and/or in which the test features T1, . . . , Tn 14 are located, by the computational device 1.

The display device 2 displays the determined routes 10 is now shown to a user for the purpose of selecting a selected route.

In this embodiment the routes are also displayed in tabular form. The routes 10 are listed in an output mask, which is located directly next to the input mask. This enables the user of the computational device 1 to view his input and the determined routes at the same time. This allows an easier correction of the inputs.

In this embodiment 10 routes 10 are determined. These routes 10 are listed in rows of the table. For all routes 12 traffic lights are determined. Total lengths of the routes are between 17 and 28 km. The average speed limit is between 59 km/h and 63 km/h. The data for the respective test characteristics are provided in further columns of the table.

The display of a representation of the determined routes 10 takes place in such a way that a user can see the frequency H1, . . . , Hn 15 of the test characteristics T1, . . . , Tn 14 for the determined routes 10.

Figure 1:
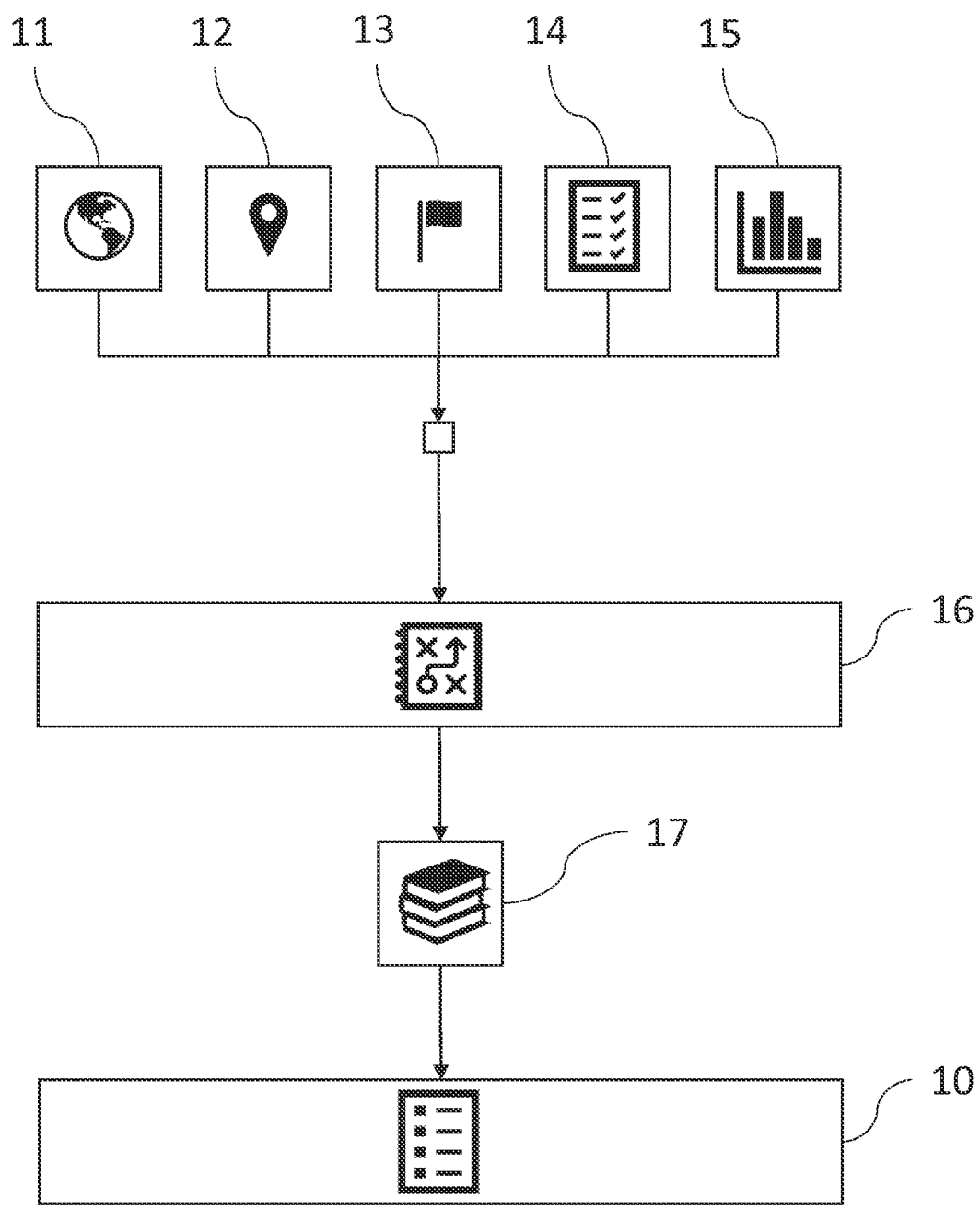
FIG. 1 schematically depicts an embodiment of a process according to one or more embodiments shown and described herein.

FIG. 1 schematically illustrates an example of an embodiment of a method according to the present disclosure. The input mask of the user of the computer 1 enters the starting point, the destination and the geographical area B. Then the input of the test characteristics and their frequencies follows. The inputs correspond to the inputs described in the first execution example. Afterwards the logical expression is generated by the computational device 1.

The computational device 1 has a processing device, and a non-transitory, processor-readable storage medium in communication with the processing device. The non-transitory, processor-readable storage medium having one or more programming instructions that, when executed, cause the processing device to perform the processes as described in the embodiments herein for determining routes for test drives of autonomous and/or partially autonomous vehicles.

In deviation from the previously described embodiment, in this execution example the database device 4 is used to access a database 17, which is located outside the computational device 1. The access is enabled by an online connection. This allows that only database 17 contains current data and still a large number of users can access the current data. The display of the determined routes 10 is shown on the display device 2 of the computational device 1.

The computer program product 5 includes a program which, when executed by the computational device 1, causes the computer 1 to execute an execution example of a method for determining routes for test drives of autonomous and/or partially autonomous vehicles. This embodiment corresponds to the one described above.

Figure 3:
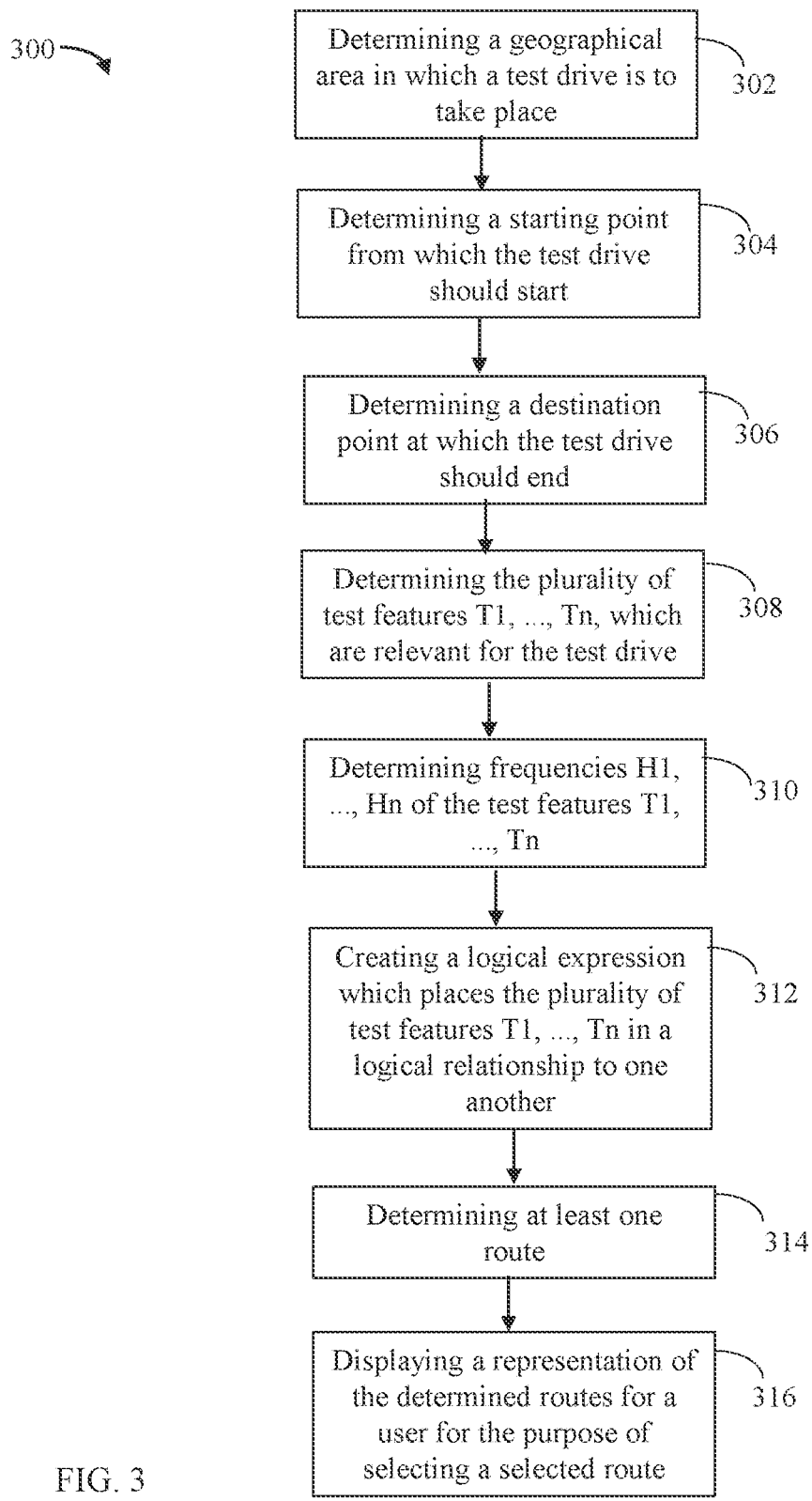
FIG. 3 graphically depicts a flowchart of an example method for determining routes for test drives of at least partially autonomous vehicles, according to one or more embodiments described and illustrated herein.

Now referring to FIG. 3, an example method for determining routes for test drives of at least partially autonomous vehicles, wherein a plurality of test features are to be encountered or avoided on the routes is illustrated by a flowchart 300. At step 302, a geographical area in which a test drive is to take place is determined. At step 304, a starting point from which the test drive should start is determined and a destination point at which the test drive should end is determined, at step 306.

At step 308, the plurality of test features T1, . . . , Tn, which are relevant for the test drive are determined and frequencies H1, . . . , Hn of the test features T1, . . . , Tn with which the plurality of test features T1, . . . , Tn are to be encountered and avoided during the test drive are determined, at step 310. A logical expression which places the plurality of test features T1, . . . , Tn in a logical relationship to one another is created, at step 312. The frequencies H1, . . . , Hn are taken into account for the generation of the logical expression.

At step 314, at least one route is determined. A computational device may be used to determine the at least one route. The at least one route is determined that are located within the geographical area, which have the starting point and the destination point and which satisfy the logical expression. A map material for the area may be stored on the database and positions or areas where the plurality of test features T1, . . . , Tn are located. At step 316, a representation of the determined routes for a user for the purpose of selecting a selected route is displayed. The displaying of the representation of the determined routes is carried out such that a user views the frequency H1, . . . , Hn of the plurality of test features T1, . . . , Tn for the determined routes.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for determining routes for test drives of at least partially autonomous vehicles, wherein a plurality of test features T1, . . . , Tn are to be encountered or avoided on the routes, the method comprising the steps:
    inputting, by a user, a geographical area in which a test drive is to take place;
    inputting, by the user, a starting point from which the test drive should start;
    inputting, by the user, a destination point at which the test drive should end;
    determining, via a computational device, a begin point from which the test drive should start based on the starting point;
    determining, via the computational device, an end point at which the test drive should end based on the destination point;
    determining, via the computational device, the plurality of test features T1, . . . , Tn, which are relevant for the test drive based on the geographical area, the begin point and the end point;
    inputting, by the user, a frequency number of a plurality of frequencies H1, . . . , Hn for each of the determined plurality of test features T1, . . . , Tn;
    determining, via the computational device, the plurality of frequencies H1, . . . , Hn of the plurality of test features T1, . . . , Tn to be encountered and avoided during the test drive to satisfy the frequency number of the plurality of frequencies H1, . . . , Hn of the plurality of test features T1, . . . , Tn;
    creating, via the computational device, a mathematical logical expression which places the plurality of test features T1, . . . , Tn and the plurality of frequencies H1, Hn of the plurality of test features T1, . . . , Tn in a logical relationship to one another;
    determining, by the computational device, a plurality of routes which are located within the geographical area, which have the starting point and the destination point and which satisfy the mathematical logical expression by utilizing a database that includes a map data for the geographical area where the plurality of test features T1, . . . , Tn are located;
    determining, by the computational device, an occurrence and position of the occurrence of each of the plurality of test features T1, . . . , Tn for the input frequency number along the each of the plurality of routes, a total distance for each of the plurality of routes, and an average speed for each of the plurality of routes; and
    displaying a representation of the plurality of routes for the user including indicating the plurality of test features T1, . . . , Tn along each of the plurality of routes, the total distance for each of the plurality of routes, and the determined average speed for each of the plurality of routes for a purpose of selecting a desired route from the plurality of routes by the user.

2. The method according to claim 1 wherein the displaying of the representation of the plurality of routes is carried out such that the user views the plurality of frequency H1, . . . , Hn of the plurality of test features T1, . . . , Tn for each of the plurality of routes.

3. The method of claim 1, wherein the plurality of test features T1, . . . , Tn includes a plurality of traffic lights.

4. The method of claim 1, wherein the plurality of test features T1, . . . , Tn includes a plurality of road signs.

5. The method of claim 1, wherein the plurality of test features T1, . . . , Tn includes a plurality of speed limits.

6. The method of claim 1, wherein the geographical area is determined by the starting point and a predetermined geographical radius surrounding the starting point.

7. A computational system for determining routes for test drives of autonomous vehicles, wherein a plurality of test features T1, . . . , Tn are to be encountered and avoided on the routes the system comprising:
    an input device configured for:
        receiving a geographical area in which a test drive is to take place;
        receiving a starting point from which the test drive is to start;
        receiving a destination point, at which the test drive is to end; and
        receiving a frequency number of a plurality of frequencies H1, . . . , Hn for each of the plurality of test features T1, . . . , Tn;
    a database device for accessing a database which includes a map data for the geographical area where the plurality of test features T1, . . . , Tn are located;
    a processing device communicatively coupled to the database device and configured to:
        determine a beginning point from which the test drive should start based on the received starting point;
        determine an ending point at which the test drive should end based on the received destination point;
        determine the plurality of test features T1, . . . , Tn, which are relevant for the test drive;
        determine the plurality of frequencies H1, . . . , Hn of the plurality of test features T1, . . . , Tn to be encountered and avoided during the test drive to satisfy the frequency number of the plurality of frequencies H1, . . . , Hn of the plurality of test features T1, . . . , Tn;
        create a mathematical logical expression which places the plurality of test features T1, . . . , Tn and the plurality of frequencies H1, . . . , Hn of the plurality of test features T1, . . . , Tn in a logical relationship to one another;
        determine a plurality of routes which are located within the geographical area, which have the starting point and the destination point and which satisfy the mathematical logical expression by utilizing the database that includes the map data for the geographical area where the plurality of test features T1, . . . , Tn are located;
        determine an occurrence and position of the occurrence of each of the plurality of test features T1, . . . , Tn for the received frequency number along each of the plurality of routes, a total distance for each of the plurality of routes, and an average speed for each of the plurality of routes; and
        display on a display device representations of each of the plurality of routes for a user including indicating the plurality of test features T1, . . . , Tn along each of the plurality of routes, the total distance for each of the plurality of routes, and the determined average speed for each of the plurality of routes for a purpose of selecting a desired route.

8. A non-transitory computer program product for determining routes for test drives of at least partially autonomous vehicles, wherein a plurality of test features T1, . . . , Tn are to be encountered or avoided on the routes, the computer program product comprising:
   a computer having a processing device and a non-transitory, processor-readable storage medium in communication with the processing device, wherein the non-transitory, processor-readable storage medium comprising one or more programming instructions that, when executed by the computer program product, cause the processing device to:
   receive a geographical area in which a test drive is to take place;
   receive a starting point from which the test drive is to start;
   receive a destination point, at which the test drive is to end;
   receive a frequency number of a plurality of frequencies H1, . . . , Hn for each of the plurality of test features T1, . . . , Tn;
   determine the geographical area in which the test drive is to take place, a beginning point from which the test drive should start based on the received starting point and an ending point at which the test drive should end based on the received destination point;
   determine the plurality of test features T1, . . . , Tn, which are relevant for the test drive;
   determine the plurality of frequencies H1, . . . , Hn of the plurality of test features T1, . . . , Tn to be encountered and avoided during the test drive to satisfy the frequency number of the plurality of frequencies H1, . . . , Hn of the plurality of test features T1, . . . , Tn;
   create a mathematical logical expression which places the plurality of test features T1, . . . , Tn and the plurality of frequencies H1, . . . , Hn of the plurality of test features T1, . . . , Tn in a logical relationship to one another;
   determine a plurality of routes which are located within the geographical area, which have the starting point and the destination point and which satisfy the mathematical logical expression by utilizing a database that includes a map data for the geographical area where the plurality of test features T1, . . . , Tn are located;
   determine an occurrence and position of the occurrence of each of the plurality of test features T1, . . . , Tn for the received frequency number along each of the plurality of routes, a total distance for each of the plurality of routes, an average speed for each of the plurality of routes; and
   display on a display device a representation of each the plurality of routes for a user including indicating the plurality of test features T1, . . . , Tn along each of the plurality of routes, the total distance for each of the plurality of routes, and the determined average speed for each of the plurality of routes for a purpose of selecting a desired route.

* * * * *